(12) United States Patent
Takayama

(10) Patent No.: US 6,570,619 B1
(45) Date of Patent: May 27, 2003

(54) CAMERA WITH SOLID-STATE IMAGE PICKUP ELEMENTS AND CONTROL DEVICE FOR CONTROLLING OPTICAL LOW-PASS FILTER

(75) Inventor: Jun Takayama, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/161,377

(22) Filed: Sep. 28, 1998

(30) Foreign Application Priority Data

Sep. 30, 1997 (JP) .............................. 9-266302

(51) Int. Cl.$^7$ .................. H04N 5/225; H04N 5/238
(52) U.S. Cl. .................. 348/342; 348/360; 348/368; 348/374
(58) Field of Search .................. 348/207, 222–224, 348/228–230, 272, 273, 335, 342–344, 362–368; 396/213, 227, 241, 268, 270, 275, 276, 354, 355, 357; 359/722, 723, 738, 739; H04N 5/228, 5/225

(56) References Cited

U.S. PATENT DOCUMENTS 5,007,719 A * 4/1991 Hasegawa .................. 359/679
5,283,691 A * 2/1994 Ogasawara .................. 359/566
5,444,574 A * 8/1995 Ono .................. 348/342
5,463,496 A * 10/1995 Ise .................. 359/497
5,999,752 A * 12/1999 Ueyama .................. 369/213
6,025,873 A * 2/2000 Nishioka .................. 348/342
6,111,608 A * 8/2000 Koizumi .................. 348/342
6,351,332 B1 * 2/2002 Okuyama .................. 359/558

* cited by examiner

*Primary Examiner*—Ngoc-Yen Vu
(74) *Attorney, Agent, or Firm*—Finnegan, Henderson, Farabow, Garrett & Dunner, L.L.P.

(57) ABSTRACT

In a camera provided with a lens system to focus light from an object along an optical path through an aperture so as to form an image of the object on a focal plane; an aperture regulator for adjusting the opening area of the aperture so as to regulate an incoming light amount on the focal plane, wherein f-number of the lens system is changed in accordance with the adjusted opening area of the aperture; image pickup elements arranged with a pitch of 7.0 μm or less on the focal plane for photoelectrically converting the light of the image so as to generate image signals; and an optical low-pass filter for eliminating high frequency components of the light of the image; there is further provided a controller for controlling the filtering performance of the optical low-pass filter in accordance with the f-number of the lens system.

7 Claims, 5 Drawing Sheets

CAMERA WITH SOLID-STATE IMAGE PICKUP ELEMENTS AND CONTROL DEVICE FOR CONTROLLING OPTICAL LOW-PASS FILTER

BACKGROUND OF THE INVENTION

This invention relates to a camera provided with a solid-state image pickup elements as image receiving means, and especially relates to a camera using as the image receiving means the solid-state image pickup elements which receives still images through an objective lens and converts them into digital signals.

Generally, in cameras provided with a solid-state image pickup elements, images projected through the objective lens on the active area of the image pickup elements such as a CCD (Charge Coupled Device) are photoelectrically converted into image signals and are further converted into digital signals.

Recently, in response to demand for high resolution capability, the pixel density of the CCD imager has increased while decreasing the overall size of the CCD size. As a result, the pixel pitch of the CCD imager is decreased considerably.

In addition, in order to optimize the light amount of the images incident on the CCD imager, an aperture regulator as aperture regulating means has been employed as same as those employed in a conventional camera for silver-halide light sensitive material.

It has been admitted that the smaller the pixel pitch of the CCD imager used as the solid-state image pickup elements for the image receiving means of the camera, the higher the resolution of the reproduced images is achieved as the number of pixels of CCD imager is increased.

It was revealed, however, that in the use of a small aperture to limit the light amount on the CCD imager, resolution and contrast of the reproduced images may be deteriorated due to the MTF (Modulation Transfer Function) deterioration caused by the diffraction in the objective lens system. This fact has impeded the improvement of the image quality of cameras as a whole.

In addition, in order to suppress the moire effect caused by the sampling pitch of the CCD imager, an optical low-pass filter is mounted in front of the CCD active area. It was also found that the combination of the influence of the diffraction by the small aperture and the elimination of high frequency components by the optical low-pass filter deteriorates the reproduced image quality under certain conditions.

SUMMARY OF THE INVENTION

The objective of the present invention is to provide a camera using solid-state image pickup elements as the image receiving means which dose not cause deterioration of the image quality, even if an aperture regulator is employed in order to regulate the light amount.

As a result of intensive study of the aforementioned problems, it is recognized that pertaining to the image quality, there is a specific relationship between pixel pitch of the solid-state image pickup elements and the F number of the aperture regulator, and also between the optical low-pass filter and the F number of the aperture regulator as well. On the basis of this study, the present invention provides a camera having the following structures which prevent the deterioration of image quality, even if an aperture regulator is employed in order to limit the light amount on the active area of the CCD imager.

1. A camera is characterized in that there are provided
    an objective lens system which projects the image of a subject onto the focal plane,
    an aperture regulating means which regulates the area of the aperture in order to limit the incoming light amount on the focal plane,
    solid-state image pickup elements which are mounted on said focal plane and yields image signals by photoelectric conversion,
    an optical low-pass filter which eliminates high frequency components of the incoming images incident on said solid-state image pickup elements, and
    a controlling means which controls the filtering characteristics of said optical low-pass filter, wherein the pixel pitch of said solid-state image pickup elements is 7.0 $\mu$m or less and said controlling means controls said optical low-pass filter in response to the F number of said aperture regulating means,
    Herein, a control of said optical low-pass filter characteristics is defined as a changing of cutoff frequency range and/or filtering effect for high frequency components.

In the camera mentioned above, in the case that the pixel pitch of the solid-state image pickup elements is 7.0 $\mu$m or less and an aperture regulator is employed in order to regulate the light amount, since the control means controls said optical low-pass filter in accordance with the F number of the aperture, the decline in resolution and contrast due to the diffraction effect may not be superimposed with the elimination of the high frequency components by the optical low-pass filter. This fact make it possible to minimize the deterioration of the image quality and to realize a camera using as the image receiving means the solid-state image pickup elements which do not degrade the image quality.

2. In the configuration described in item 1, said control means controls the filtering characteristics by inserting said optical low-pass filter into the optical path and/or removing it.

In the camera mentioned above, as an effect of the correlative control with the F number of the aperture by inserting and/or removing said optical low-pass filter, the decline of resolution and contrast due to the diffraction effect in the objective lens system could not be duplicated with the lack of the high frequency components suppressed by the optical low-pass filter, even if pixel pitch of the solid-state image pickup elements is less than 7.0 $\mu$m and a mechanical aperture regulator is employed. This fact would make it possible to minimize the deterioration of the image quality and to realize a high resolution camera with a solid-state image pickup elements.

3. In the configuration described in item 2, said control means removes the optical low-pass filter from the optical path, in case the F number of said aperture regulator mean is more than 5.6.

In the camera mentioned above, as an effect of the correlative control with the F number of the aperture, wherein insertion and removal control of said optical low-pass filter is active, and said optical low-pass filter should be removed from the optical path when the F number of the aperture exceeds 5.6, the decline of resolution and contrast due to the diffraction effect in the objective lens system could not be duplicated with the lack of the high frequency components suppressed by the optical low-pass filter, even if pixel pitch of the solid-state image pickup elements is less than 7.0 $\mu$m and a mechanical aperture regulator is employed. This fact would make it possible to minimize the deterioration of the image quality and to realize a high resolution camera with a solid-state image pickup elements.

4. In the configuration described in item 1, plurality of optical elements, each of which has a different effect by high frequency filtering, are provided for selective control of said low-pass filter. Said control means selects the optimum element in response to the F number of the aperture.

In the camera mentioned above, as an effect of the selective control of said low-pass filter in response to the F number of the aperture, the decline of resolution and contrast due to the diffraction effect in the objective lens system could not be duplicated with the lack of the high frequency components suppressed by the optical low-pass filter, even if pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

5. In the configuration described in item 4, said control means selects one of optical elements or a combination of a plurality of them.

In the camera mentioned above, as an effect of the selective control of said low-pass filter in response to the F number of the aperture, wherein either one of the optical elements or a combination of a plurality of them would be selected, the decline of resolution and contrast due to the diffraction effect in the objective lens system could not be duplicated with the lack of the high frequency components suppressed by the optical low-pass filter, even if pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

6. The present invention relates to a camera comprised of:
   a) an objective lens system which projects the image of a subject onto the focal plane,
   b) an aperture regulating means which controls the degree of aperture opening in order to limit the incoming light amount on the focal plane,
   c) a solid-state image pickup elements which is mounted on said focal plane and yields image signals by the photo electric conversion,
   d) an optical low-pass filter which eliminates high frequency components of the incoming images focused on said solid-state image pickup elements, and
   e) a control means which inserts said optical low-pass filter into the optical path and/or removes it from the optical path. In addition, the pixel pitch of the solid-state image pickup elements should be less than 7.0 μm, and the filtering characteristics of said optical low-pass filter should be controlled in response to the F number of said aperture regulator.

In the camera mentioned above, as an effect of the insertion and/or removal control of said low-pass filter in the optical path, the decline of resolution and contrast due to the diffraction effect in the objective lens system could not be duplicated with the lack of the high frequency components suppressed by the optical low-pass filter, even if pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

7. In the configuration described in item 6, said control means removes the optical low-pass filter from the optical path, in case the F number of said aperture regulating means is more than 5.6.

In the camera mentioned above, as an effect of the correlative control with the F number of the aperture, wherein insertion and remove control of said optical low-pass filter is active and said optical low-pass filter should be removed from the optical path when the F number of the aperture exceeds 5.6, the decline of resolution and contrast due to the diffraction effect in the objective lens system could not be duplicated with the lack of the high frequency components suppressed by the optical low-pass filter, even if pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

8. In the configuration described in item 6, a plurality of optical elements, each of which has a different high frequency filtering effect, are provided for selective control of said low-pass filter. Said control means would insert said optical low-pass filter into the optical path in response to the F number of the aperture.

In the camera mentioned above, as an effect of the selective control of said low-pass filter in response to the F number of the aperture, the decline of resolution and contrast due to the diffraction effect in the objective lens system could not be duplicated with the lack of the high frequency components suppressed by the optical low-pass filter, even if pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

9. In the configuration described in item 8, said control means would insert one of said optical low-pass filters or a combination of a plurality of them.

In the camera mentioned above, as an effect of the selective control of said low-pass filter in response to the F number of the aperture, wherein either one of the optical elements or a combination of a plurality of them would be selected, the decline of resolution and contrast due to the diffraction effect in the objective lens system could not be duplicated with the lack of the high frequency components suppressed by the optical low-pass filter, even if pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

BRIEF DESCRIPTION OF THE DRAWINGS

Other objectives and advantages of the present invention will become apparent upon reading the following detailed description and upon reference to the drawings in which.

DETAILED DESCRIPTION OF THE PREFERRED EMBODIMENT

In the following description, the preferred embodiment of the present invention will be described in detail, wherein the still camera would be preferred as an example of a camera with a solid-state image pickup elements used as the image receiving means.

1. Configuration of the Still Camera

To aid in the understanding of the present invention, the configuration of a still camera which embodies the present invention will be detailed.

Figure 1:
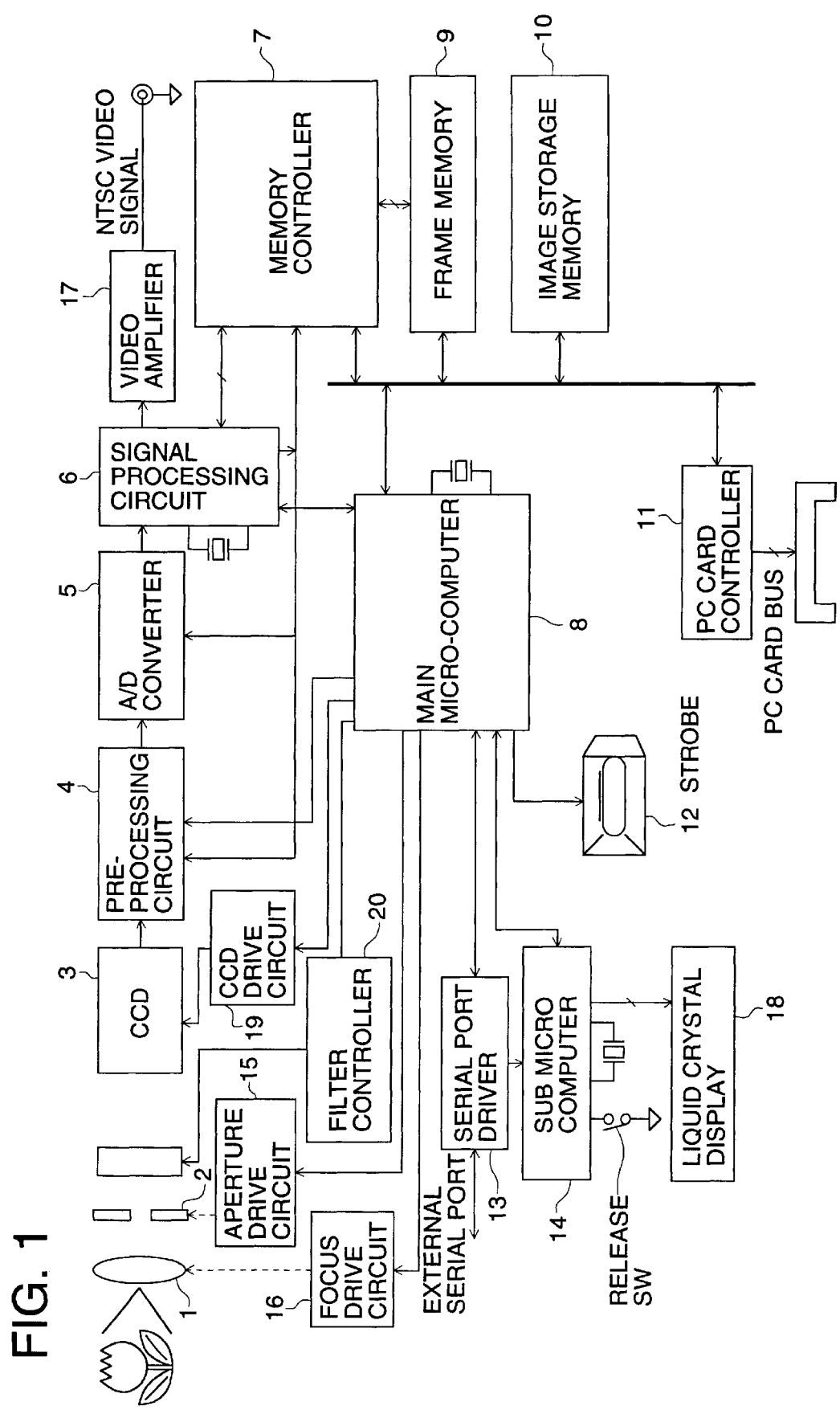
FIG. 1 is a functional block diagram of a still camera wherein the present invention may be embodied.

FIG. 1 shows a functional block diagram of the still camera, illustrating the electrical signal flow as a whole.

An image light (light to form an image) captured through the optical system composed of objective lens 1, aperture regulator 2, optical low-pass filter LF, etc. is focused on the active area of image pickup elements 3 such as CCD, MOS, etc.(hereinafter CCD 3). The objective lens 1 and aperture regulator 2 are driven by focus drive circuit 16 and aperture regulator drive circuit 15 respectively. In addition, a optical low-pass filter LF which is the means for optically eliminating high frequency components of the image light, such as crystal filter, etc., is controlled by filter controller 20 in response to the F number of aperture regulator 2.

After the image light focused on the active area of CCD 3 is converted into an electrical charge by photo-electric converting action, CCD 3 yields analog image signals by the transfer pulse fed from CCD drive circuit 19. Since CCD drive circuit 19 can control shutter speed in addition to the driving of CCD 3 so that incoming light amount is automatically controlled irrespective of the area of aperture.

In pre-processing circuit 4, the analog image signals fed from CCD 3 undergo various kinds of processing such as CDS (Correlative Double Sampling) processing for noise reduction, AGC (Automatic Gain Control) for optimum gain control, Knee processing for expansion of the dynamic range, etc.

After pre-processed image signals are converted to digital image signals by A/D converter 5, said digital image signals are further converted to digital video signals {for example, luminance signals (Y) and chrominance signals (Cr, Cb)} by being applied with luminance and chrominance processing in signal processing circuit 6, and are outputted to memory controller 7. In addition, image processing, which emphasizes the high frequency components of the image signal, is activated as necessary.

On the other hand, a D/A converter is also included in signal processing circuit 6. This D/A converter permits outputting of the analog video signals by D/A converting action for color video signals inputted from A/D converter 5, or image data reversely inputted from memory controller 7.

Switchover of the above mentioned functions are achieved by exchanging data with a main micro-computer 8. The exposure information of image pickup element signal, focusing signals and white balance information may be outputted to main micro-computer 8 as necessary.

A main micro computer 8 mainly performs the sequential functions of shooting, recording and playback, and also performs the compression and expansion of photographed images as well as the serial port transfer with peripheral equipment in accordance with necessity. Regarding the compression of still images, the methods of CCITT (at that time) and JPEG or JBIG (standardized by ISO) would be employed. In addition, regarding the compression of moving images, the method of MPEG (standardized by ISO and IEC) would be employed.

Under control of memory controller 7, the digital image signals fed from signal processing circuit 6 are stored in frame memory 9 and conversely, image data stored in frame memory 9 could be fed back to signal processing circuit 6.

A frame memory 9 should have a capacity for storing more than 1 frame of image data. For example, the frame memory comprised of VRAM, SRAM, DRAM, etc. have typically been used for this purpose. In this embodiment, VRAM, which works independently of the CPU bus line, is employed for the frame memory.

A image storage memory 10 is the internal memory incorporated in the main body. The image data stored in frame memory 9 undergo the compressive processing of image data in main micro-computer 8 and then are stored in the image storage memory 10. For example, the image storage memory comprised of SRAM, DRAM, EEPROM, flash memory, etc. may typically be used for this purpose. EEPROM and/or flash memory, however, may be more suited for this than the others, since those are nonvolatile memories which maintain image data irrespective of cutting power off.

A PC card controller (PCMCIA controller) 11 is used for interfacing the external memory device, such as PC memory card (hereinafter referred to as a PC card) with main micro-computer 8. The image data stored in frame memory 9 is transferred to the external memory device through the PC card controller 11 after the compressive processing of image data in main micro-computer 8. For example, SRAM card, DRAM card, EEPROM card, etc. are available for the external PC card interfaced by PC card controller 11. Furthermore, use of a modem card and/or an ISDN card allow the image data to be transferred directly to different locations through public telephone lines.

Flash timing of strobe 12 is determined by main micro-computer 8 under the sequential control of the shooting mode.

Information exchange between the camera and peripheral devices is achieved by converting the data signal in serial port driver 13. Although RS232C, RS422A, etc. are the recommended standards for serial data communication, in this embodiment, RS232C is preferred as a serial transfer means.

A sub micro-computer 14 controls interface functions between the user and the camera such as operating switches, liquid crystal display, etc. and transfers information through the serial transfer port to main micro computer 8 as needed. In addition, the control of automatic dating is performed by the timer function equipped in the sub micro-computer 14.

The aperture regulator drive circuit 15, for example, is constructed by an automatic iris diaphragm and/or other devices and changes the F number of optical aperture regulator 2 under the control by main micro-computer 8. The focus drive circuit 16, for example, is constructed by stepping motor and/or other devices and changes the lens position under the control by main micro-computer 8 so as to coincide the optical focal plane with the active area of CCD 3. Liquid crystal display 18 is connected with sub-micro-computer 14 and indicates various information such as photographing information.

Filter controller 20 is a means for controlling the degree of the elimination of high frequency components contained in image light by the low-pass filter function of optical low-pass filter LF and controls optical low-pass filter LF in response to the F number of the aperture regulator 2.

Although compression and expansion of the image data is performed by main micro-computer 8 in the configuration of FIG. 1, it may be possible that an exclusive circuit for this purpose is equipped on the CPU bus line.

2. Fundamental Performance of a Still Camera

In the following description, successive actions, from the photographing or the shooting to the recording in the memory storage, will be described in detail.

At first, the operating mode of the camera is set based on the status of the switches connected to sub micro-computer 14. Then, the data for shooting are inputted to main micro-computer 8 as serial data.

In response to the inputted information, main micro-computer 8 sets the status of memory controller 7 and serial port driver 13. When the release switch on the sub micro-computer 14 is activated by the photographer, sub micro-computer 14 detects the activation of first switch signal S1 and commands signal processing circuit 6 to input the image, wherein signal processing circuit 6 receives the image data by activating CCD 3, pre-process circuit 4 and A/D converter 5.

Fundamental signal processing is performed in signal processing circuit 6, yielding focus and exposure information derived from high and low frequency components of light amount data respectively. Based on the focus and exposure information yielded from signal processing circuit 6, optimum setting of exposure and focus is achieved by control actions of main micro-computer 8 which controls the aperture regulator drive, the focus drive and the gain of the AGC amplifier in pre-process circuit 4, as needed. In addition, certain operating modes allow the analog image signals to be outputted as NTSC video signals through signal processing circuit 6 and video amplifier 17.

After the exposure and focusing reach optimum values, the activation of the second switch signal S2 is transferred to main micro-computer 8 from sub micro computer 14, wherein the release switch is comprised of two step switching of the first switch for preparation and the second switch for shutter activation. Then, main micro-computer 8 commands memory controller 7 to store the image data, and forwards a flash command signal to strobe 12 at the time of storing the field image data as needed. Based on the command for storing the image data, memory controller 7 detects the synchronized signal in signal processing circuit 6 and transfers the image data fed from signal processing circuit 6 to frame memory 9 at the predetermined time, wherein the image data contains such image signals as Y, Cr, Cb, etc.

After the storage of the image data in frame memory 9, memory controller 7 flags the status to main micro-computer 8. Detecting the status of the completion of a shooting sequence, main micro-computer 8 performs image compression processing as needed, and then, transfers the image data to image storage memory 10, external IC card and/or personal computer connected through the external serial port.

In the playback display mode, main micro-computer 8 retrieves the image data from image storage memory 10, external IC card and/or personal computer connected through the external serial port and stores them in frame memory 9, wherein image expansion processing is performed as needed. Then, the stored image data are converted to analog image signals in signal processing circuit 6 and memory controller 7. The analog image signals will be transferred to an external display device through the NTSC image signal output port. Sequential functions of shooting, recording, playback, display and data transfer in the still camera are achieved as mentioned above.

In this embodiment, considering the special relationship pertaining to the image quality between the pixel pitch of the CCD and the F number of the aperture regulator, in the case that the pixel pitch of the CCD is 7.0 $\mu$m or less and the F number of the aperture regulator 2 exceeds a predetermined value, optical low-pass filter LF is controlled by main micro-computer 8 and filter controller 20.

As an effect of the above mentioned configuration and controls, even in the case that an aperture regulator is employed in order to regulate the light amount, the decline in resolution and contrast due to the diffraction effect may not be superimposed with the elimination of the high frequency components by the optical low-pass filter. This fact make it possible to minimize the deterioration of the image quality and to realize a camera using as the image receiving means the solid-state image pickup elements which do not degrade the image quality.

It may be a practical example of the embodiment described above that the main micro-computer 8 and filter controller 20 control the filtering characteristics by inserting optical low-pass filter LF into the optical path and/or removing it. In case the F-number of aperture regulator 2 is more than 5.6, optical low-pass filter LF will be removed from the optical path.

With the same manner, it is also possible that a plurality of optical low-pass filter LF differing in the degree of high frequency component elimination are prepared and controlled such that one of them is selectively used. Further, the plurality of optical low-pass filter LF can be selectively used in combination.

As a result of the above, since the optimum optical low-pass filter LF is used in accordance with the F number of the aperture regulator, the deterioration in resolution and contrast caused in accordance with the F number of the aperture regulator 2 can be minimized and it may be possible to realize a camera provided with solid-state image pickup elements which do not degrade image quality, as the image receiving means.

In addition, a polarizing filter can be used instead of the function of the optical low-pass filter. For instance, in cases that the aperture is fully opened or F number is 5.6, the optical low-pass filter would be inserted. In cases that the F number is 11, the size of aperture is set at the same size as that for F number of 8 and a polarizing filter is added so as to decrease the light amount. Whereby the light amount corresponds to that of the F number of 11. Further, by adjusting the optical axis of the polarizing filter to that of the optical low-pass filter, the polarizing filter may be used instead of the function of the optical low-pass filter.

EMBODIMENT

In the following, based on the examples and comparisons, verification of the above mentioned embodiment will be described in detail.

Figure 2:
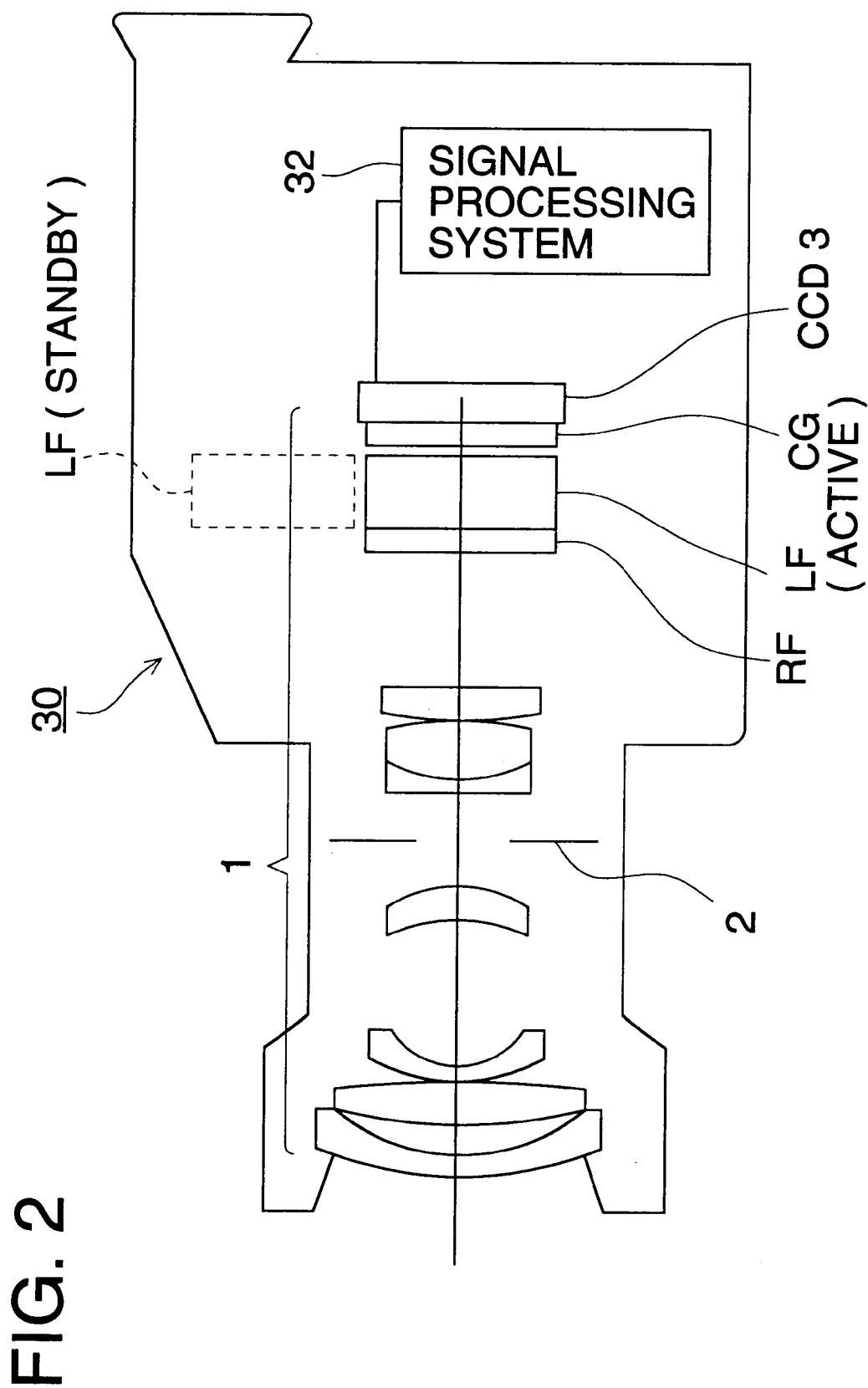
FIG. 2 is a longitudinal sectional view of the optical system used in the embodiment of said still camera, illustrating a rough arrangement of the optical elements.

FIG. 2 is a longitudinal sectional view of the optical system used in the embodiment of the still camera, illustrating a rough arrangement of the optical elements. In FIG. 2, the still camera 30 is comprised of objective lens 1, CCD 3 and signal processing system 32, which contains various kinds of processing circuits explained with regard to FIG. 1.

In this arrangement, an image of the subject will be projected on the active area of CCD 3, passing through the 7 lenses of objective lens 1, infrared filter RF, optical low-pass filter LF and cover glass CG.

In FIG. 2, active and standby positions of optical low-pass filter LF, in other words, inserted position and removed position, are designated by solid and broken lines, respectively.

The following CCD imagers were employed for verification and comparison of the embodiment in the following description.

① ICX084K (commercial code), manufactured by SONY Corp. Active area (light receiving face): ⅓ inch, Total number of pixels: 330,000, Pixel pitch: 7.5 μm ② ICX089K (commercial code), manufactured by SONY Corp. Active area: ¼ inch Total number of pixels: 330,000 Pixel pitch: 5.6 μm ③ MN3773 (commercial code), manufactured by Matsushita Corp.

Active area: ½.72 inch Total number of pixels: 1,000,000 Pixel pitch: 4.6 μm

Hereinafter, the pixel pitch is defined as the distance between centers of two adjacent light receiving elements in the image pickup elements. In case that the center distances between horizontal and vertical directions are different, the shorter one is chosen for the pixel pitch.

In addition, the optical resolution of lens 1 incorporated in the embodiment under evaluation is shown as follow.

Figure 3:
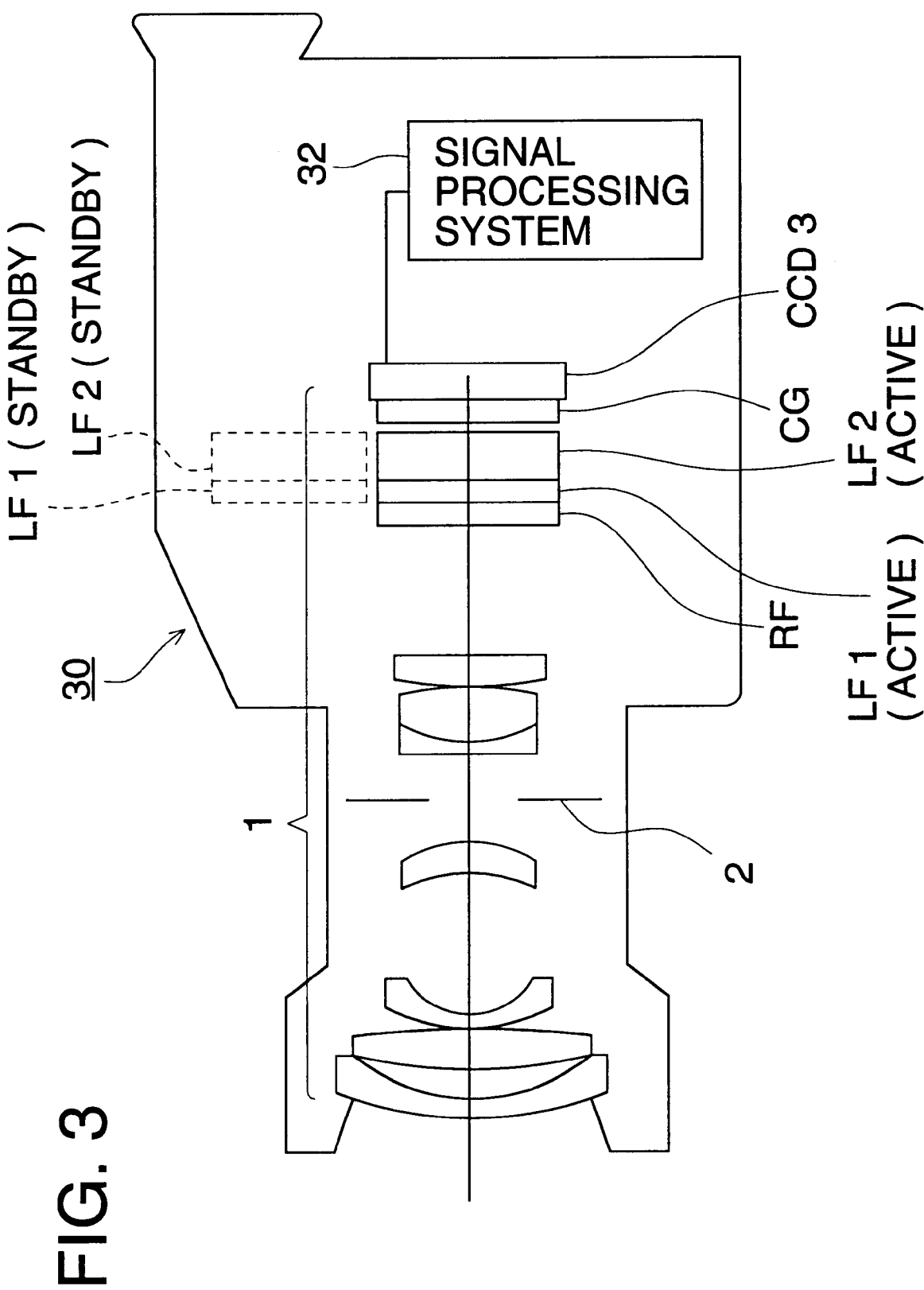
FIG. 3 is a longitudinal sectional view of the optical system, illustrating another embodiment of the optical low-pass filter.
Figure 4:
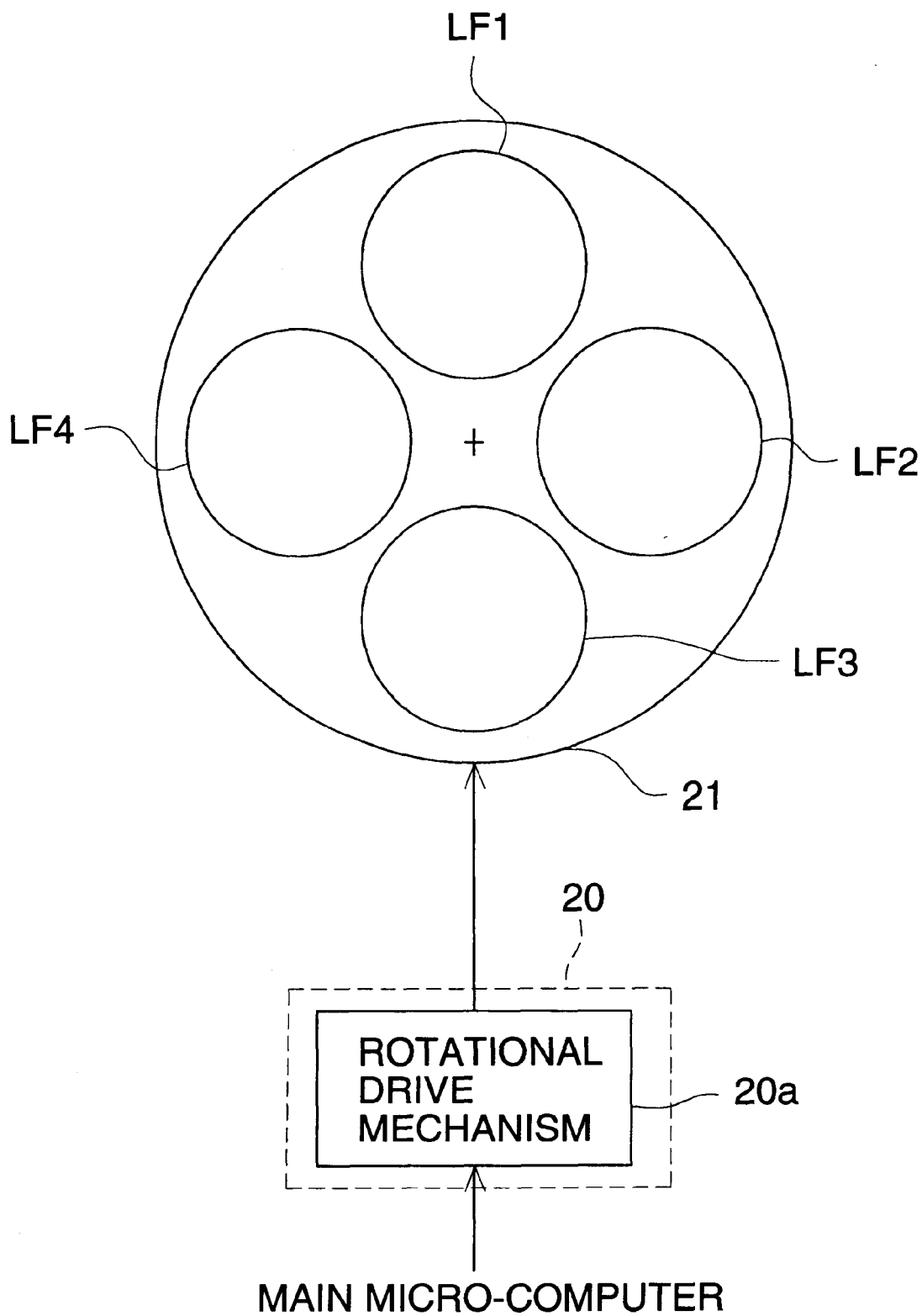
FIG. 4 is a schematic functional illustration of the optical low-pass filter showing an example of the embodiments.

Resolution (at center)=160 lines/mm or more
Resolution (in periphery)=100 lines/mm or more As shown in FIG. 3, a plurality of optical low-pass filters (for instance, LF1 and LF2) are provided as the optical low-pass filter LF. One of them or both may be selected and controlled so as to be inserted into or removed from the optical path.

It is also possible to provide a single optical low-pass filter which has an equivalent effect instead of a plurality of filter elements as shown in FIG. 3.

In this case, a plurality of optical low-pass filter LF differing in the degree of high frequency component elimination are prepared, one of them is selectively used, or some of the plurality of optical low-pass filter LF are selectively used in combination. Whereby the degree of high frequency component elimination as the function of the low-pass filter can be controlled finely.

In addition, a plurality of optical low-pass filter LF (herein LF1 to LF4) differing in the degree of high frequency component.elimination are arranged on a rotating plate 21. By selectively inserting one of them into the optical path by rotation drive mechanism 20a, it may be possible to control finely the degree of high frequency component elimination.

Another example to make the different degree of high frequency component elimination of optical low-pass filter is to change the thickness of the low-pass filter element.

Figure 5:
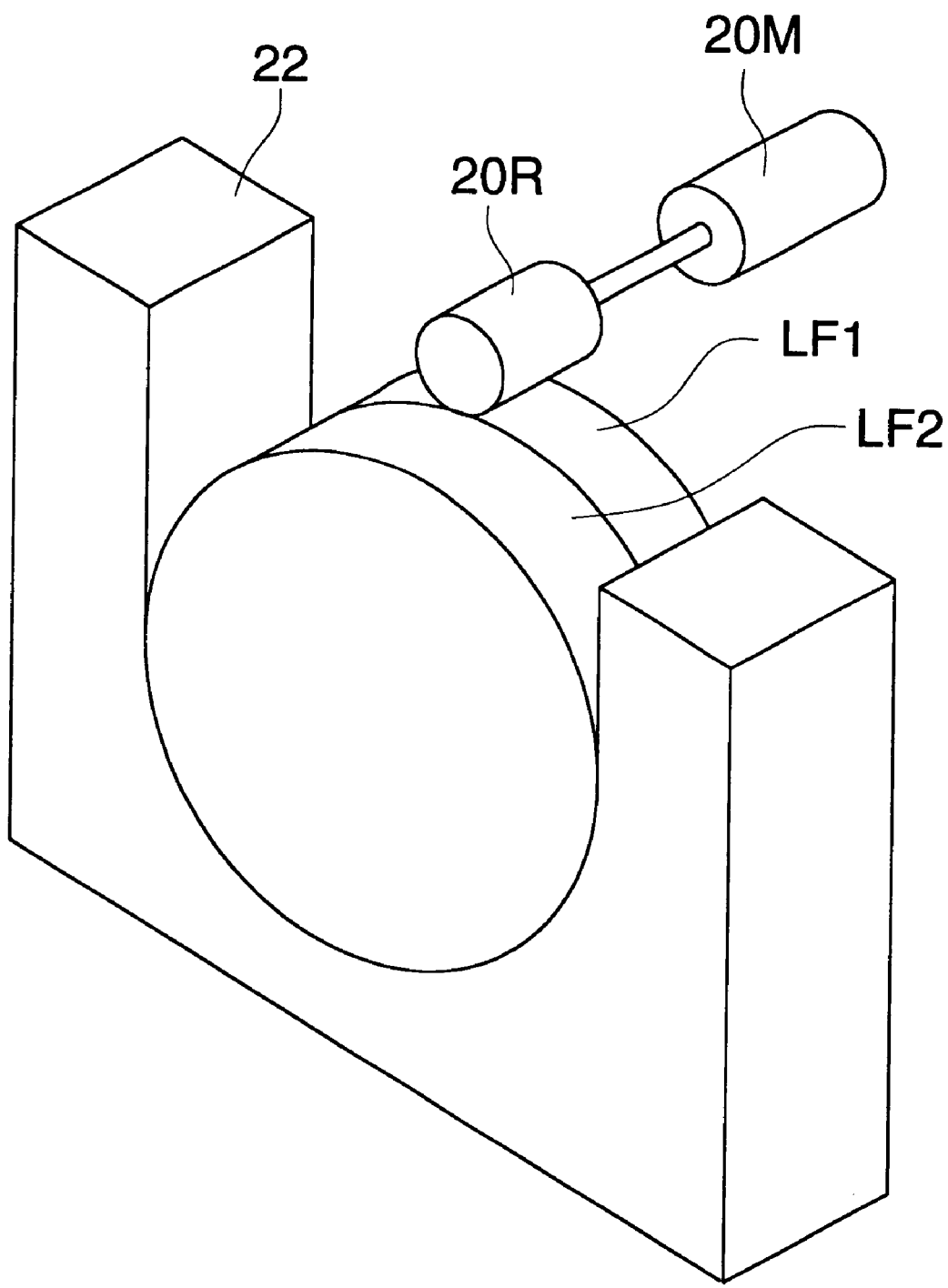
FIG. 5 is a partial perspective view of the optical low-pass filter showing another example of the embodiments.

Furthermore, as shown in FIG. 5, two pieces of optical low-pass filters LF1 and LF2 are arranged. By relatively rotating them (herein, the LF1 is rotated by the motor 20M and the rotor 20R), the crystal axes of the two pieces of optical low-pass filters can be coincident with each other or deviated from each other. In this case, if the crystal axis of LF1 coincides with that of LF2 (relative angle being 0°), the sum effects of the two pieces of optical low-pass filters can be obtained. While, in case that the crystal axes are located at a relative angle of 180°, the effect of the optical low-pass filters can not be obtained. In the case of a middle position between 0° and 180°, the sum effect of the low-pass filter varies in proportion to the relative angle. Therefore, the fine control of the filtering effect could be achieved by adjusting the relative angle between the two pieces of optical low-pass filters in response to the F number of aperture regulator under the controlling action of filter controller 20.

In the following, to clarify the advantages of the preferred embodiment, some results of image quality evaluation will be described. Based on the images captured by CCD 3 with 7.5 μm pixel pitch, comparison data were gleaned by changing the pixel pitch of the CCD 3 on the aforementioned embodiment.

Relative evaluations mentioned above were performed by 10 people as examiners.

Images for the evaluation were obtained by shooting the resolution test chart equipped on the position of 2m ahead from the objective lens and were printed out in hard copies by the printer with sufficient resolution power. To obtain a total evaluation result, resolution, contrast and sharpness of the hard copies were evaluated in three stages by examiners.

Results of the three stage evaluation were classified as follow.

good=+1 point, marginal=0 point, inferior=−1 point

Case 1: Under the Control of Inserting and Removing the Optical Low-pass Filter

Total points of each image is shown in table 1 as a quality points, wherein the quality points A was obtained in case of inserting and fixing the optical low-pass filter LF1 and the quality points B was obtained in cases of removing the optical low-pass filter LF1 when the F number of aperture regulator exceeds 5.6.

In the following tables, symbols of [○] and [-] designate insertion and removal of the optical low-pass filter, respectively.

TABLE 1

(to be prepared)

| | Example for Comparison | | | | The Present Invention | | | | | | | |
|---|---|---|---|---|---|---|---|---|---|---|---|---|
| Pixel Pitch | 7.5 (μm) | | | | 5.6 (μm) | | | | 4.6 (μm) | | | |
| F Number | 2.8 | 5.6 | 8 | 11 | 2.8 | 5.6 | 8 | 11 | 2.8 | 5.6 | 8 | 11 |
| Quality Points A | 3 | 3 | 2 | 2 | 7 | 6 | 5 | 4 | 9 | 8 | 6 | 3 |
| Quality Points B | 3 | 3 | 2 | 2 | 7 | 7 | 6 | 5 | 9 | 9 | 7 | 4 |
| Low-pass Filter | ○ | ○ | — | — | ○ | ○ | — | — | ○ | ○ | — | — |

As shown in table 1, providing optical low-pass filter LF is removed from the optical path in case that the pixel pitch of the CCD imager is 7.0 μm or less and the F number is 5.6 or more, the decline of resolution and contrast due to the diffraction effect could not be superimposed with the elimination of the high frequency components by optical low-pass filter LF. This fact would make it possible to maintain the image quality within minimum deterioration.

Moreover, in case that the pixel pitch of the CCD imager is 5.0 μm or less, a suppressing effect for the decline of resolution and contrast was remarkable.

In case that the pixel pitch of the CCD imager is 7.0 μm or more, however, little effect for improvement of the image quality was recognized, even if optical low-pass filter LF is removed from the optical path in case the F number is 5.6 or more. This is because of little decline of resolution and contrast due to the diffraction effect.

Case 2: Under the Selective Control of a Plurality of Optical Low-pass Filters LF Based on the employment of optical low-pass filter LF shown in FIG. 3, when thickness of LF1, LF2 and LF3 are defined as dLF1, dLF2 and dLF3, optical low-pass filter having the relationship of DLF1>dLF2>dLF3, respectively were used.

Total points of each image is shown in table 2 as a quality points, wherein the quality points A was obtained in cases of firmly inserting the optical low-pass filter LF1 and the quality points B was obtained in cases of selecting one of the optical low-pass filters LF1, LF2 and LF3 and firmly inserting the selected optical low-pass filter.

TABLE 2

(to be prepared)

| | Example for Comparison | | | | The Present Invention | | | | | | | |
|---|---|---|---|---|---|---|---|---|---|---|---|---|
| Pixel Pitch | 7.5 (μm) | | | | 5.6 (μm) | | | | 4.6 (μm) | | | |
| F Number | 2.8 | 5.6 | 8 | 11 | 2.8 | 5.6 | 8 | 11 | 2.8 | 5.6 | 8 | 11 |
| Quality Points A | 3 | 3 | 2 | 2 | 7 | 6 | 6 | 5 | 9 | 8 | 6 | 3 |
| Quality Points B | 3 | 3 | 2 | 2 | 7 | 7 | 7 | 6 | 9 | 9 | 7 | 4 |
| Low-pass Filter | LF1 | LF2 | LF3 | | LF1 | LF2 | LF3 | | LF1 | LF2 | LF3 | |

As shown in table 2, providing optical low-pass filter LF is selected in response to the F number of the aperture in case the pixel pitch of the CCD imager is less than 7.0 μm, the decline of resolution and contrast due to the diffraction effect could not be duplicated with the lack of the high frequency components suppressed by optical low-pass filter LF. This fact would make it possible to prevent the image quality deterioration.

Although the present invention described in the above embodiment could be applied for any kind of camera such as still cameras, digital cameras, etc., an application to the still camera is especially effective, because of demands for high resolution capability and use of aperture regulator.

As described in the above embodiments, the following merits and effects reside in the present inventions described in this specification.

(1) As an effect of the correlative control of said optical low-pass filter with the F number of the aperture, the decline of resolution and contrast due to the diffraction effect in the objective lens system could not be duplicated with the lack of the high frequency components suppressed by the optical low-pass filter, even if the pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

(2) As an effect of the correlative control with the F number of the aperture by inserting and/or removing said optical low-pass filter, the decline of resolution and contrast due to the diffraction effect in the objective lens system could not be duplicated with the lack of the high frequency components suppressed by the optical low-pass filter, even if pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

(3) As an effect of the correlative control with the F number of the aperture, wherein insertion and removal control of said optical low-pass filter is active, and said optical low-pass filter should be removed from the optical path when the F number of the aperture exceeds 5.6, the decline of resolution and contrast due to the diffraction effect in the objective lens system could not be duplicated with the lack of the high frequency components suppressed by the optical low-pass filter, even if pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

(4) As an effect of the selective control of said low-pass filter in response to the F number of the aperture, the decline of resolution and contrast due to the diffraction effect in the objective lens system could not be duplicated with the lack of the high frequency components suppressed by the optical low-pass filter, even if pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

(5) As an effect of the selective control of said low-pass filter in response to the F number of the aperture, wherein either one of the optical elements or a combination of a plurality of them would be selected, the decline of resolution and contrast due to the diffraction effect in the objective lens system could not be duplicated with the lack of the high frequency components suppressed by the optical low-pass filter, even if pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

(6) As an effect of the insertion and/or removal control of said low-pass filter in the optical path, the decline of resolution and contrast due to the diffraction effect in the objective lens system could not be duplicated with the lack of the high frequency components suppressed by the optical low-pass filter, even if pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

(7) As an effect of the correlative control with the F number of the aperture, wherein-insertion and remove control of said optical low-pass filter is active and said optical low-pass filter should be removed from the optical path when the F number of the aperture exceeds 5.6, the decline of resolution and contrast due to the diffraction effect in the objective lens system could not be duplicated with the lack of the high frequency components suppressed by the optical low-pass filter, even if pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

(8) As an effect of the selective control of said low-pass filter in response to the F number of the aperture, the decline of resolution and contrast due to the diffraction effect in the objective lens system could not be duplicated with the lack of the high frequency components suppressed by the optical low-pass filter, even if pixel pitch of the solid-state image pickup elements is less than 7.0 μm and a mechanical aperture regulator is employed. This fact would make it possible to minimize the deterioration of the image quality and to realize a high resolution camera with a solid-state image pickup elements.

(9) As an effect of the selective control of said low-pass filter in response to the F number of the aperture, wherein either one of the optical elements or a combination of a plurality of them would be selected, the decline of resolution and contrast due to the diffraction effect in the objective lens system could not be duplicated with the lack of the high frequency components suppressed by the optical low-pass filter, even if pixel pitch of the solid-state image pickup elements is less than 7.0 µm and a mechanical aperture regulator is employed. This fact would make it possible to minimize the deterioration of the image quality and to realize a high resolution camera with a solid-state image pickup elements.

What is claimed is:

1. A camera, comprising:

a lens system to focus light from an object along an optical path through an aperture so as to form an image of the object on a focal plane;

a regulating device for adjusting an opening area of the aperture so as to regulate an incoming light amount on the focal plane, wherein f-number of the lens system is changed in accordance with the adjusted opening area of the aperture;

image pickup elements provided on the focal plane and for photoelectrically converting the light of the image so as to generate image signals, the image pickup elements arranged with a pitch of 7.0 µm or less;

an optical low-pass filter for eliminating high frequency components of the light of the image; and a control device for controlling the filtering performance of the optical low-pass filter to change the degree of high frequency component elimination in accordance with the f-number of the lens system in case that the f-number is 5.6 or more so that a deterioration of an image quality caused by increasing the f-number is minimized.

2. The camera of claim 1, wherein the control device controls the filtering performance by inserting the optical low-pass filter into the optical path or removing the optical low-pass filter from the optical path.

3. The camera of claim 1, further comprising:

a plurality of optical low-pass filters differing in the elimination degree of high frequency component, wherein the control device selects at least one of the plurality of optical low-pass filters in accordance with the f-number.

4. The camera of claim 3 wherein the control device selects plural optical low-pass filters to use them in combination.

5. A camera, comprising:

a lens system to focus light from an object along an optical path through an aperture so as to form an image of the object on a focal plane;

a regulating device for adjusting an opening area of the aperture so as to regulate an incoming light amount on the focal plane, wherein f-number of the lens system is changed in accordance with the adjusted opening area of the aperture;

image pickup elements provided on the focal plane and for photoelectrically converting the light of the image so as to generate image signals, the image pickup elements arranged with a pitch of 7.0 µm or less;

an optical low-pass filter for eliminating high frequency components of the light of the image; and a control device for inserting the optical low-pass filter in the optical path or removing the optical low-pass filter from the optical path in accordance with the f-number of the lens system, wherein the control device removes the optical low-pass filter from the optical path in case that the f-number is 5.6 or more so that a deterioration of an image quality caused by increasing the f-number more than 5.6 is minimized.

6. The camera of claims 5, further comprising:

a plurality of optical low-pass filters differing in the elimination degree of high frequency component, wherein the control device selectively inserts at least one of the plurality of optical low-pass filters in accordance with the f-number.

7. The camera of claim 6, wherein the control device selects plural optical low-pass filters to use them in combination.

* * * * *